US012651259B2

(12) United States Patent
Paunoiu et al.

(10) Patent No.: US 12,651,259 B2
(45) Date of Patent: Jun. 9, 2026

(54) MULTI-PARTY BLOCKCHAIN ADDRESS SCHEME

(71) Applicant: nChain Licensing AG, Zug (CH)

(72) Inventors: Alexandru Paunoiu, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 143 days.

(21) Appl. No.: 18/559,773

(22) PCT Filed: Apr. 11, 2022

(86) PCT No.: PCT/EP2022/059565
§ 371 (c)(1),
(2) Date: Nov. 8, 2023

(87) PCT Pub. No.: WO2022/238065
PCT Pub. Date: Nov. 17, 2022

(65) Prior Publication Data
US 2024/0281806 A1      Aug. 22, 2024

(30) Foreign Application Priority Data
May 10, 2021      (GB) ..................................... 2106637

(51) Int. Cl.
*G06Q 20/38*          (2012.01)
*H04L 9/32*           (2006.01)
(52) U.S. Cl.
CPC ......... *G06Q 20/389* (2013.01); *H04L 9/3236* (2013.01)
(58) Field of Classification Search
None
See application file for complete search history.

(56) References Cited

U.S. PATENT DOCUMENTS

2015/0120569 A1*   4/2015   Belshe ............... G06Q 20/3829
                                                705/71

FOREIGN PATENT DOCUMENTS

EP          3313020 A1      4/2018
JP       2021507566 A       2/2021
                (Continued)

OTHER PUBLICATIONS

Pour: ("Bitcoin multisig the hard way: Understanding raw P2SH multisig transactions", Dec. 20, 2014, URL: https://www.soroushjp.com/2014/12/20/bitcoin-multisig-the-hard-way-understanding-raw-multisignature-bitcoin-transactions/) (Year: 2014).*

(Continued)

*Primary Examiner* — Patrick Mcatee
*Assistant Examiner* — Jason B Fenstermacher
(74) *Attorney, Agent, or Firm* — Galvani Smith PLLC

(57)          ABSTRACT

A method of generating a blockchain transaction comprising: generating a transaction comprising a locking script comprising a first shared hash value (HV) generated by applying a hash function (HF) to a second shared HV, wherein the second shared HV is generated by applying a HF to a combination of the respective public keys, and wherein the locking script is configured to require an unlocking script to comprise a target public key, a target signature, and an intermediate HV generated based on all but one of the respective public keys, apply the HF to the target public key to generate a target HV, combine the target HV and the intermediate HV to generate a target second shared HV, apply the HF to the target second shared HV to generate a target first shared HV, an verify that the target first HV matches the first shared HV, and verify the target signature.

20 Claims, 6 Drawing Sheets

(56) References Cited

FOREIGN PATENT DOCUMENTS

| WO | WO-2019092544 | A1 | * | 5/2019 | ............. | H04L 63/12 |
|----|----|----|----|----|----|----|
| WO | 2020079534 | A1 | | 4/2020 | | |
| WO | 2020240295 | A1 | | 12/2020 | | |
| WO | 2020240319 | A1 | | 12/2020 | | |
| WO | 2021014233 | A1 | | 1/2021 | | |

OTHER PUBLICATIONS

Yunlei Zhao: "Aggregation of Gamma-Signatures and Applications to Bitcoin", IACR, International Association for Cryptologic Research, vol. 20181205:162615 Dec. 5, 2018 (Dec. 5, 2018), pp. 1-22, XP061027085, Retrieved from the Internet: URL:http://eprint.iacr.org/2018/414.pdf (Year: 2018).*

Antonopoulos, "Mastering Bitcoin", Publisher: O'Reilly Media, Inc., Release Date: Dec. 2014 (Year: 2014).*

Anonymous., "Universal hashing—Wikipedia," Mar. 12, 2021, 8 pages, Retrieved from the Internet URL: https://en.wikipedia.org/w/index.php?title=Universal_hashing&oldid=1011781210#Hashing_integers.

Antonopoulos A.M., "Mastering Bitcoin," Chapter 6: Transactions, Jul. 21, 2017, pp. 117-148, Retrieved from the Internet URL: https://www.oreilly.com/library/view/mastering-bitcoin-2nd/9781491954379/.

Combined Search and Examination Report for the Application No. GB2106637.8, dated Feb. 9, 2022, 13 pages.

Combined Search Report and Abbreviated Examination Report for the Application No. GB2106641.0, dated Sep. 6, 2021, 6 pages.

Combined Search Report and Abbreviated Examination Report for the Application No. GB2106642.8, dated Sep. 7, 2021, 6 pages.

Computer Science Wiki Contributors: "Merkle Proof" Computer Science Wiki, Mar. 8, 2020, Retrieved from the Internet URL: https://computersciencewiki.org/index.php/Merkle_proof.

Garcia L.C.C., "On the Security and the Efficiency of the Merkle Signature Scheme," Technical Report 2005/192, Cryptology ePrint Archive 2005, Retrieved from the Internet URL: https://eprint.iacr.org/2005/192.pdf.

International Search Report and Written Opinion for the Application No. PCT/EP2022/059565, dated Aug. 2, 2022, 16 pages.

International Search Report and Written Opinion for the Application No. PCT/EP2022/059595, dated Jul. 18, 2022, 14 pages.

International Search Report and Written Opinion for the Application No. PCT/EP2022/059603, dated Jun. 23, 2022, 14 pages.

Karame G.O., et al., "Two Bitcoins at the Price of One? Double-Spending Attacks on Fast Payments in Bitcoin," IACR Cryptology, 2012, Retrieved from the Internet URL: https://eprint.iacr.org/2012/248.pdf.

Klmoney., "Bitcoin: Dissecting Transactions," Sep. 20, 2020, Retrieved from the Internet: URL: https://web.archive.org/web/20200920075245/https://klmoney.wordpress.com/bitcoin-dissecting-transactions/.

Swambo J., et al., "Bitcoin Covenants: Three Ways to Control the Future," arxiv.org, Cornell University Library, 201 Olin Library Cornell University Ithaca, NY 14853, Jun. 30, 2020 (Jun. 30, 2020), XP081710755.

Walker G., "P2MS (Pay To Multisig)," Aug. 15, 2020, Retrieved from the Internet: URL: https://web.archive.org/web/20200815162938/https://learnmeabitcoin.com/technical/p2ms.

Wiki., "Secp256k1—Bitcoin Wiki," En.bitcoin.it, 2019, 2 pages, Retrieved from the Internet URL: https://en.bitcoin.itlwiki/Secp256k1.

Wikipedia contributors., "Merkle Tree," Wikipedia, The Free Encyclopedia, Wikipedia, Oct. 17, 2023, Retrieved from the Internet URL: https://en.wikipedia.org/wiki/Merkle_tree.

Yao A.C., et al., "Online/Offline Signatures for Low-Power Devices," IEEE Transactions on Information Forensics and Security, vol. 8, No. 2, Feb. 1, 2013, pp. 283-294, XP011487934, ISSN: 1556-6013, DOI: 10.1109/TIFS.2012.2232653.

Zhao Y., "Aggregation of Gamma-Signatures and Applications to Bitcoin," IACR, International Association for Cryptologic Research, Dec. 5, 2018, vol. 20181205:162615, pp. 1-22, Retrieved from the Internet: URL: http://eprint.iacr.org/2018/414.pdf.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

MULTI-PARTY BLOCKCHAIN ADDRESS SCHEME

CROSS REFERENCE TO RELATED APPLICATIONS

This application is the U.S. National Stage of International Application No. PCT/EP2022/059565 filed on Apr. 11, 2022, which claims the benefit of United Kingdom Patent Application No. 2106637.8, filed on May 10, 2021, the contents of which are incorporated herein by reference in their entireties.

TECHNICAL FIELD

The present disclosure relates to a method of generating an output of a blockchain transaction that can be unlocked by one of a plurality of parties, and to a method of generating a blockchain transaction for unlocking such an output.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

3

SUMMARY

Spending UTXOs typically relies on cryptographic methods that allow parties to prove the knowledge of a necessary piece of information, commonly known as a knowledge proof. For example, a UTXO may be locked by a hash puzzle that requires an input of a spending transaction to contain data that, when hashed, results in a specific hash that forms part of the hash puzzle. Moreover, there exist schemes which allow one of multiple knowledge proofs to be used in order to spend a UTXO. Examples of such schemes are described in international patent applications WO2021014233 and WO2020240295. See section 8 below for more details. However, both schemes suffer from drawbacks. The schemes presented in WO2021014233 and WO2020240295 require, respectively, a Merkle proof and an additional signature to be presented in the unlocking script of the spending transaction. The checking of a Merkle proof and a signature is expensive, both in terms of computational requirements (e.g. when processing and/or validating the transaction) and storage requirements.

It would therefore be desirable to provide an improved scheme that allows one on a plurality of parties to spend a UTXO which does not suffer from the same computational and storage problems of existing schemes.

According to one aspect disclosed herein, there is provided a computer-implemented method of generating a blockchain transaction, the transaction being for transferring an amount of a digital asset from a first party to one of a plurality of second parties, wherein each second party is associated with a respective public key, and wherein the method is performed by a coordinating party and comprises: generating a first blockchain transaction, wherein the first blockchain transaction comprises a first locking script comprising a first shared hash value, the first shared hash value being generated by applying a first hash function to a second shared hash value, wherein the second shared hash value is generated by applying a second hash function to a combination of the respective public keys, and wherein the first locking script is configured to, when executed together with a first unlocking script of a second blockchain transaction, a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and making the first blockchain transaction available to at least one of: one or more nodes of a blockchain network, the first party, one of more of the plurality of second parties, and one or more third parties.

According to one aspect disclosed herein, there is provided a computer-implemented method of generating a blockchain transaction, the transaction being for unlocking an amount of a digital asset locked to one of a plurality of second parties, wherein each second party is associated with a respective public key and each respective public key is associated with a respective index, wherein the first blockchain transaction comprises a first locking script comprising a first shared hash value, the first shared hash value being generated by applying a first hash function to a second shared hash value, wherein the second shared hash value is generated by applying a second hash function to a combination of the respective public keys, wherein the respective public keys are combined in an order based on the associated respective index, and wherein the first locking script is configured to, when executed together with a first unlocking script of a second blockchain transaction, a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and wherein the method is performed by a target one of the second parties and comprises:

generating the second blockchain transaction, wherein the second blockchain transaction comprises an input that references the first locking script of the first blockchain transaction and the first unlocking script, the first unlocking script comprising the respective public key associated with the target second party, an intermediate hash value generated based on each of the respective public keys of the second parties except that of the target second party, and a valid signature for the respective public key associated with the target second party; and making the second blockchain transaction available to at least one of: one or more nodes of a blockchain network, the first party, one of more of the plurality of second parties, and one or more third parties.

Each second party (e.g. user) is associated with a public key in the sense that a given party has access to the private key corresponding to their public key. Therefore each party can generate a signature that can be linked to, i.e. verified with, that party's public key. Each party is also associated with a respective index. This is equivalent to each public key being associated with the respective index. In order to be unlocked, the first locking script requires a second party to provide in an unlocking script of a spending transaction (the second transaction) their public key, and a valid signature that can be verified using that public key. An intermediate hash value (discussed below) must also be provided. The items need not necessarily be placed in the unlocking script in that order.

The first locking script includes a first shared hash value. The first shared hash value is generated by applying a first hash function to a hash of a combination of the second parties' public keys, where the combination of public keys is hashed using a second hash function. That is, a second hash value is generated by hashing a combination of the public keys, and then the first hash value is generated by hashing the second hash value. The first and second hash functions may be the same or different hash functions. Note that the term "shared hash value" is merely a convenient label for the hash value, and it need not necessarily be shared in the sense that each second party receives or has access to the shared hash value. The public keys may be combined using a linear function, e.g. addition.

Upon being executed, the first locking script is configured to hash the target public key with the second hash function to generate a target hash value. The first locking script is also configured to combine the target hash value with the intermediate hash value to generate a target second shared hash value. The first locking script is configured to then hash the target second shared hash value with the first hash function to generate a target first shared hash value, and verify that the target first hash value is the same as the first shared hash value included in the first locking script. In addition, the first locking script verifies that the signature provided by the second party in the unlocking script is a valid signature for the provided public key. Note that the order of at least some of these steps may be changed.

The intermediate hash value provided by the second party in the unlocking script must be based on each of the second parties' public keys, except for the second party providing the intermediate hash value. In other words, if there are five second parties, the intermediate hash value is based on four public keys, one for each of the other second parties. That way, when the intermediate hash value and target second shared hash value are hashed, the resulting target first shared hash value should be equal to the first shared hash value.

Embodiments of the present invention enable the coordinator to generate a multi-party address, where the address is "multi-party" in the sense that it can be unlocked by any one of a group of parties. For instance, the multi-party address may act as a shared bank account between members of a family, or a company, or an organisation, etc. Taking the example of a family, payments can be sent to the multi-party address (i.e. bank account), and any member of the family (i.e. account holders) may spend those funds.

Unlike the multi-party schemes described in WO2021014233 and WO2020240295, the first locking script does not entail executing a computationally expensive Merkle proof, nor does it require additional signature checks.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

1. Example System Overview

Figure 1:
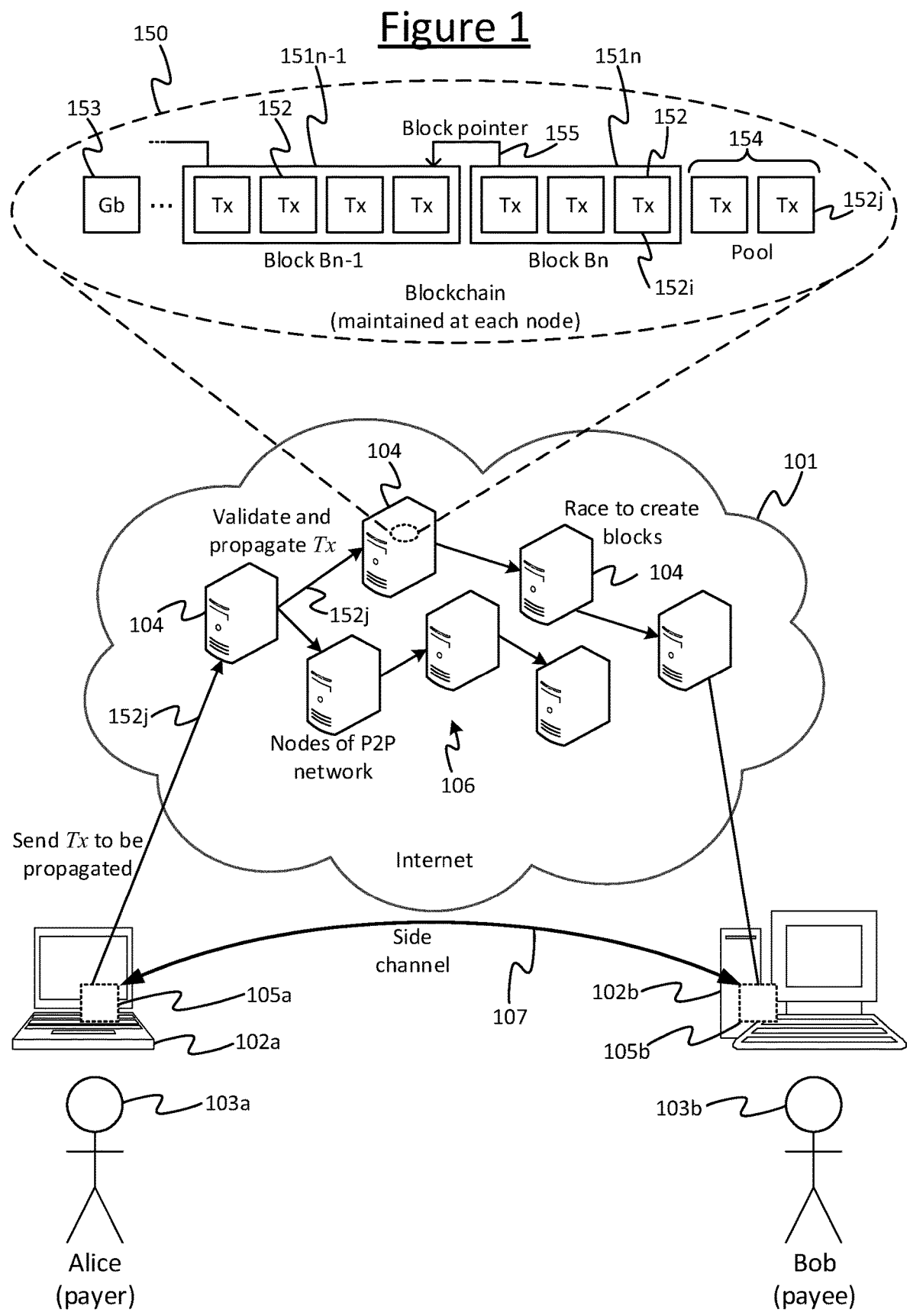
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. Utxo-Based Model

Figure 2:
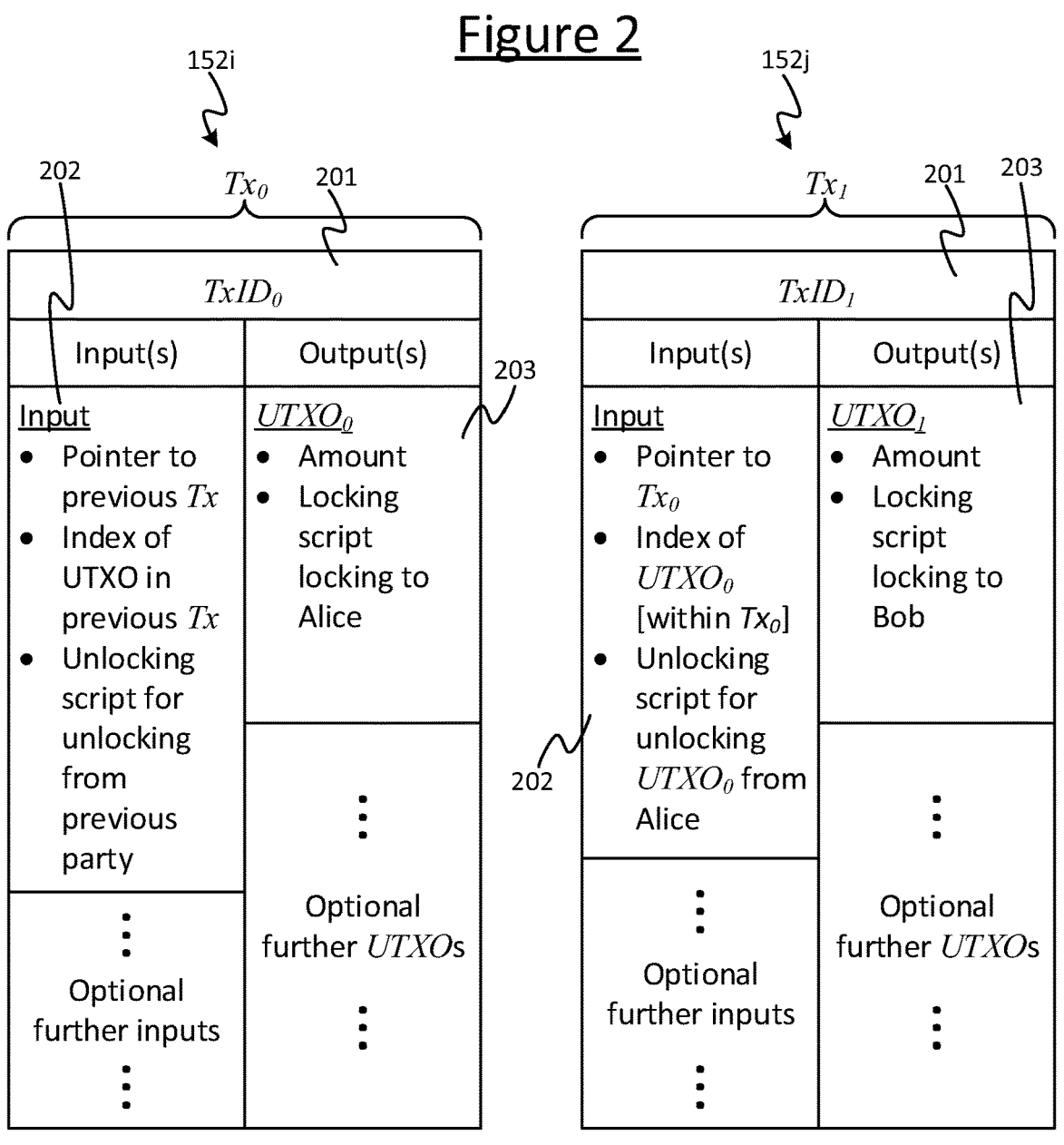
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx$_1$". It takes an amount of the digital asset that is locked to Alice in the output 203 of a preceding transaction 152*i* in the sequence, and transfers at least some of this to Bob. The preceding transaction 152*i* is labelled "Tx$_0$" in FIG. 2. Tx$_0$ and Tx$_1$ are just arbitrary labels. They do not necessarily mean that Tx$_0$ is the first transaction in the blockchain 151, nor that Tx$_1$ is the immediate next transaction in the pool 154. Tx$_1$ could point back to any preceding (i.e. antecedent) transaction that still has an unspent output 203 locked to Alice.

The preceding transaction Tx$_0$ may already have been validated and included in a block 151 of the blockchain 150 at the time when Alice creates her new transaction Tx$_1$, or at least by the time she sends it to the network 106. It may already have been included in one of the blocks 151 at that time, or it may be still waiting in the ordered set 154 in which case it will soon be included in a new block 151. Alternatively Tx$_0$ and Tx$_1$ could be created and sent to the network 106 together, or Tx$_0$ could even be sent after Tx$_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction Tx$_0$ comprises a particular UTXO, labelled here UTXO$_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO$_0$ in the output 203 of Tx$_0$ comprises a locking script [Checksig PA] which requires a signature Sig PA of Alice in order for UTXO$_0$ to be redeemed (strictly, in order for a subsequent transaction attempting to redeem UTXO$_0$ to be valid). [Checksig PA] contains a representation (i.e. a hash) of the public key P$_A$ from a public-private key pair of Alice. The input 202 of Tx$_1$ comprises a pointer pointing back to Tx$_1$ (e.g. by means of its transaction ID, TxID$_0$, which in embodiments is the hash of the whole transaction Tx$_0$). The input 202 of Tx$_1$ comprises an index identifying UTXO$_0$ within Tx$_0$, to identify it amongst any other possible outputs of Tx$_0$. The input 202 of Tx$_1$ further comprises an unlocking script <Sig P$_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction Tx$_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig P$_A$><P$_A$>||[Checksig PA]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key PA of Alice, as included in the locking script in the output of Tx$_0$, to authenticate that the unlocking script in the input of Tx$_1$ contains the signature of Alice signing the expected portion of data. The expected portion of data itself (the "message") also needs to be included in order to perform this authentication. In embodiments the signed data comprises the whole of Tx$_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Client Software

Figure 3A:
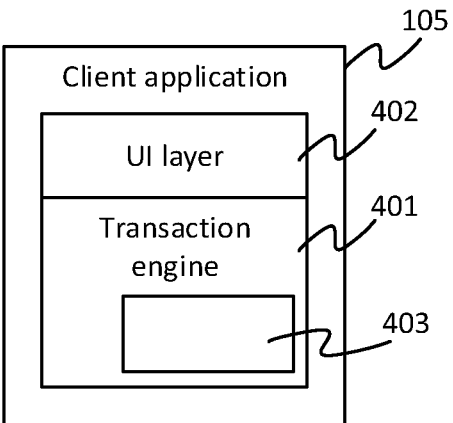
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
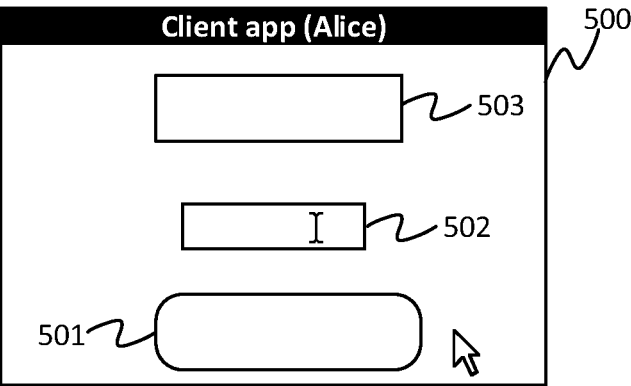
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 502. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

5. Node Software

Figure 4:
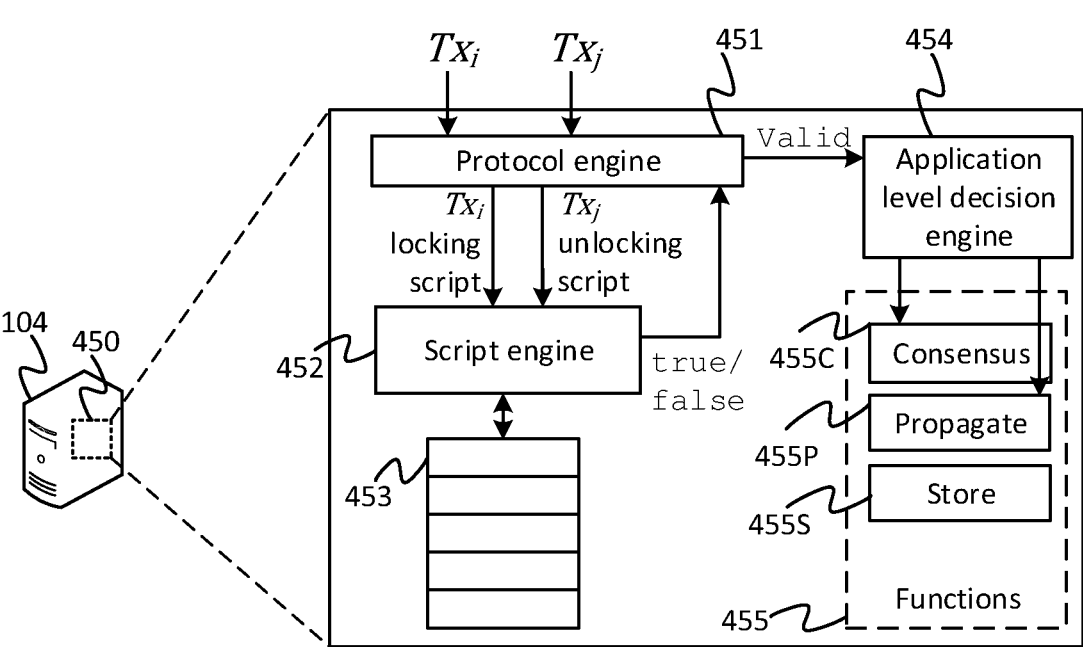
FIG. 4 is a schematic block diagram of some node software for processing transactions, FIG. 5 schematically illustrates an example system for locking a transaction output to a multi-party address, and FIG. 6 schematically illustrates the generation of an intermediate hash value and a second shared hash value that is used for generating a first hash value.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152j (Tx$_j$) is received having an input pointing to an output (e.g. UTXO) of another, preceding transaction 152i (Tx$_{m-1}$), then the protocol engine 451 identifies the unlocking script in Tx$_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

6. Cryptographic Concepts

6.1 Hash functions

Hash functions H map data of any size to outputs of fixed length. An example of a hash function is modular functions such as $$H_0(x) = ax + b \bmod p \bmod q$$

where p, q are large primes, and $a \in \mathbb{Z}^*{}_P$, $b \in \mathbb{Z}_P$. Cryptographic hash functions, such as SHA-256 and RIPEMD-160, require additional properties to be satisfied:
  preimage resistance,
  second preimage resistance, and
  collision resistance.

6.2 Elliptic Curves

An example of an elliptic curve that may be used in the described embodiments is the curve secp256k1 defined as points (x,y) over the prime field $\mathbb{F}_P$ satisfying:

$$y^2 = x^3 + 7 \bmod p,$$

where $p = 2^{256} - 2^{32} - 2^9 - 2^8 - 2^7 - 2^6 - 2^4 - 1$. The collection of points (x,y) together with the associated point at infinity $\mathcal{O}$ define the finite set $E(\mathbb{F}_P)$. Then $(E(\mathbb{F} p), +)$ is the elliptic curve group, where + is the curve point addition operation. $(E(\mathbb{F}_P), +)$ is of prime order $n = \#E(\mathbb{F}_P)$ and we denote a generator point of $E(\mathbb{F}_P)$ by G. The scalar multiplication aG is then defined as $$aG = \underbrace{G + G + \ldots + G}_{a}.$$

6.3 Elliptic Curve Digital Signature Algorithm

Assume that the private key $a \in \{1,2, \ldots, p-1\}$ corresponding to the public key P=aG has been generated. The ECDSA signing algorithm is the following:
  1. Randomly choose an integer $k \in \{1,2, \ldots, n-1\}$ representing the ephemeral key
  2. Compute kG=(x, y)
  3. Compute r=x mod n. If r=0, go to step 1.
  4. Compute $k^{-1}$ in the prime field $\mathbb{F}_n$.
  5. Compute the hash digest of the message msg, e=SHA-256(SHA-256(msg)).
  6. Compute $s = k^{-1}(e+ar)$ mod n. If s=0, go to step 1.
  7. Output the signature (r, s).

The signature (r, s) corresponding to the public key P will be denoted by $Sig_P$. Sometimes we emphasize the relation between s and P by writing $s_P$. The signature can be verified with the inputs the signature (r, s), public key P and message msg with the following steps:
  1. Compute the message hash digest e=SHA-256(SHA-256(msg)).
  2. Compute $s^{-1}$ in the prime field $\mathbb{F}_n$
  3. Compute $j_1 = es^{-1}$ mod n and $j_2 = rs^{-1}$ mod n
  4. Compute the point addition $Q = j_1 G + j_2 P$
  5. If $Q = (x, y) \neq \mathcal{O}$ and x mod n=r, then the signature is valid, otherwise it's invalid.

Note that here the message hash digest e is computed with regard to the Bitcoin specifications.

7. Script

Script (capital S) is an example of a scripting language used in some blockchain protocols. Whilst embodiments of the present invention are not limited to any one particular scripting language, Script is used here as an illustrative example. An example unlocking script of a pay-to-public-key-hash (P2PKH) script is:

$$\langle Sig_P \rangle \langle P \rangle ,$$

where P is the public key, $Sig_P = (r, s_P)$ is the ECDSA signature corresponding to the public key P and signed transaction (implicitly considered), and r is obtained from the ephemeral key. The above script unlocks an output with the locking script:

OP_DUP OP_HASH160⟨ H(P)⟩ OP_EQUALVERIFY OP_CHECKSIG where H is the cryptographic hash function corresponding to the opcode OP_HASH160.

8. Existing Multi-Party Output Schemes

8.1 R-Puzzle

The R-Puzzle payment scheme was introduced in WO2020240295. Given a signature of the form (r', s') it allows any public key to unlock a transaction, as long as the signature created using the corresponding private key contains the given r'.

The unlocking script: $\langle Sig_P \rangle \langle P \rangle \langle Sig_{P,r'} \rangle$ unlocks the script:

OP_DUP OP_3 OP_SPLIT OP_NIP OP_1 OP_SPLIT OP_SWAP OP_SPLIT OP_DROP OP_HASH160 ⟨ H(r')⟩ OP_EQUALVERIFY OP_OVER OP_CHECKSIG-VERIFY OP_CHECKSIG where the signatures of the form $Sig_P = (r, s_P)$ and $Sig_P, = (r', s'_P)$. $s_P$ and $s'_P$ are generated from the same public key P and message msg. Thus, any public key P can be used to unlock the above locking script as long as $Sig_{P,r'}$ is generated with r' which is derived from an ephemeral key.

The storage of the above scripts is negligible in terms of complexity which is of order O(1), i.e. it does not scale with the number of parties that have knowledge of r'. However Although in theory the computational time of validating the unlocking script is of order O(1), in practice it is computationally expensive to check two signatures. This is because in general a validator (e.g. a blockchain node) has to process the transaction twice to validate the two signatures. In particular, the transaction must be hashed twice, once for each signature check, requiring expensive processes such as hashing and elliptic curve arithmetic, with hashing being costly, especially for large transactions.

8.2 Merklized Smart Contracts

WO2021014233 introduced the idea of Merklized Smart Contracts whereby several parties can spend a transaction containing the Merkle root of the Merkle tree formed using their public keys. Such transactions can be spent with unlocking scripts containing the spending party's signature, public key and Merkle proof. Form parties, the computational time required to validate the unlocking script is of order $O(\log_2 m)$ due to the Merkle proof. Similarly, the space of the locking and unlocking script is of order $O(\log_2 m)$ as the size of each hash is a constant.

9. Multi-Party Address

Figure 5:
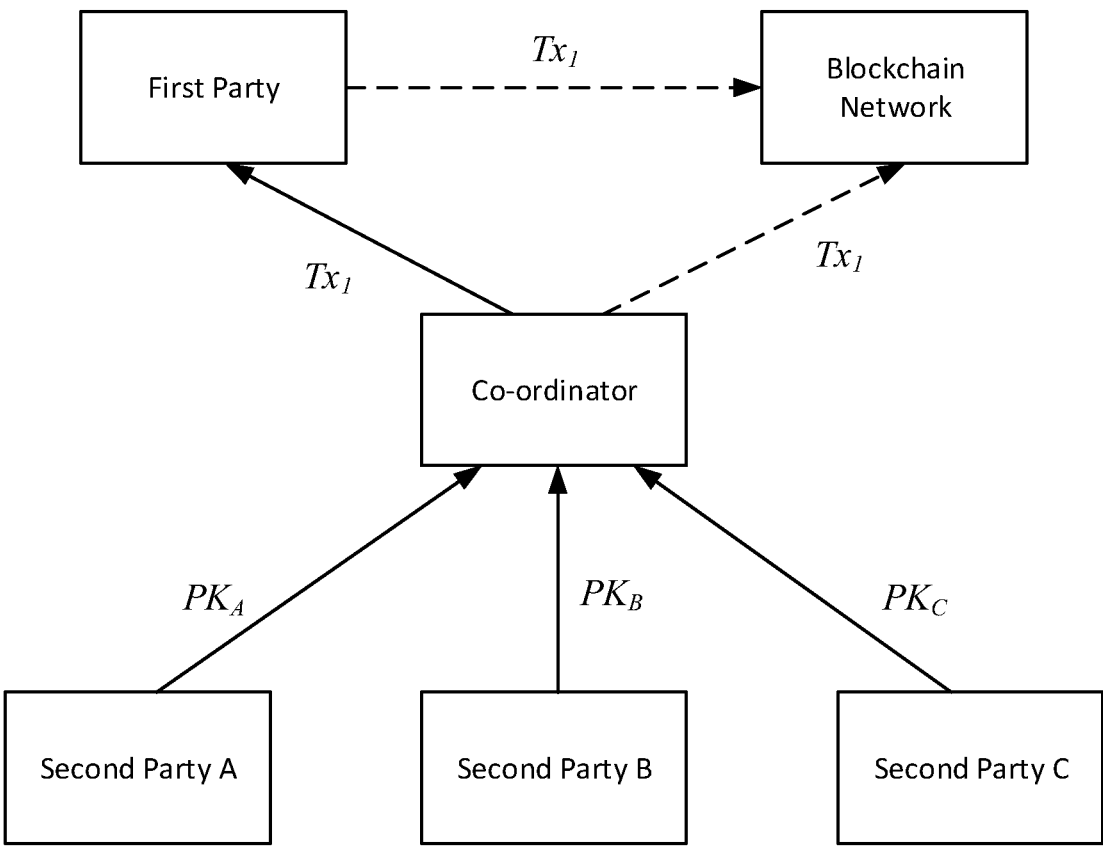

Embodiments of the present invention provide a novel addressing scheme that enables one of a group of multiple parties to spend a UTXO. FIG. 5 illustrates an example system 500 for implementing such embodiments. The system 500 comprises a first party 501 and a plurality of second parties 502. Only three second parties are shown in FIG. 5 but in general the system 500 may comprise any number of second parties 502. The system 500 also comprises a coordinating party 503. The coordinating party 503 may be one of the second group of parties 502, i.e. the coordinating party 503 may be a second party 502. In other examples, the coordinating party 503 is not one of the second parties 502. In some examples, the coordinating party 503 may be the same as the first party 501.

Each of the first party 501, the second parties 502 and the coordinating party 503 operate respective computing equipment, e.g. computing equipment 102. For instance, the first party 501 and each of the second parties 502 may be configured to perform some or all of the actions described above as being performed by Alice 103a and/or Bob 103b (or rather, by their respective computing equipment 102a, 102b).

The first party 501 is associated with a first public key. Each of the second parties 502 is associated with a respective second public key. To be associated with a public key means that the party has access to (e.g. stores in memory) the corresponding private key. Each of the second parties 502 may be associated with a respective index. For instance, a first one of the second parties 502a may be associated with the index 1, a second one of the second parties 502b may be associated with the index 2, and so on. Note that the indices do not necessarily need to be sequential. For instance, there may be three second parties with respective indexes 4, 9 and 2. Similarly, the indexes need not be integer numbers. For instance, the indexes may be letters. However one requirement is that each second party 502 is associated with a unique index, where the index is unique with the group of second parties 502. Note that a second party 502 being associated with an index is equivalent to the respective public key of that second party 502 being associated with the index.

The coordinating party (or "coordinator") 503 is configured to generate a first blockchain transaction. The first blockchain transaction comprises one or more outputs. A first one of the outputs (not necessarily the output that appears first logically in the list of outputs of the transaction), locks an amount of digital asset. The first output comprises a first locking script. The first locking script comprises a first hash value, which is referred to herein as a "first shared hash value" The first shared hash value is generated by hashing a second hash value. The second shared hash value is generated by hashing a combination of the second parties' public keys. The second shared hash value does not need to be included in the first locking script, although that is not excluded. The first shared hash value is generated by applying a first hash function to the second shared hash value. Any suitable hash function may be used, e.g. SHA-256.

The second hash value is a hash of a linear combination of the public keys. For instance, the public keys may be summed and then hashed. The second hash function may be a linear and/or modular hash function, e.g. the hash function described above in section 6.1:

$$H_0(x) = ax + b \bmod p \bmod q.$$

The first locking script is configured so as when executed alongside an unlocking script of a spending transaction (e.g. a second transaction), to require the unlocking script to comprise at least an intermediate hash value, a public key, and a signature. The intermediate hash value, public key and signature included in the unlocking script of the second transaction will be referred to as the target intermediate hash value, the target public key and the target signature, respectively. When the first locking script is executed, it applies the second hash function (in-script) to the target public key to produce a target hash value. The target hash value is a public key hash generated with the second hash function, i.e. the same second hash function that is used (off-chain) to generate the second shared hash value. The first locking script is also configured to combine the target hash value (the public key hash) with the intermediate hash value to produce a target second shared hash value. Then, the first locking script is configured to apply the first hash function (in-script) to the target second shared hash value to produce a target first shared hash value. The first hash function is the same hash function that is used (off-chain) to generate the first shared hash value that is included in the first locking script. The first locking script is also configured to, when executed, verify that the target first shared hash value matches (i.e. is the same as) the first shared hash value. In this sense, the first locking script ensures that the target intermediate hash value and the target public key result in (as part of the script execution) an expected hash value, i.e. a pre-calculated hash value. If the target first shared hash value and the expected first shared hash value do not match, then the execution of the first locking script will fail.

The first locking script is also configured to, when executed, validate the target signature using the target public key. In other words, the first locking script is configured to verify that the target signature is a valid signature for the target public key. The verification of the target signature may be performed before or after the comparison of the generated and expected second shared hash values.

Having generated the first blockchain transaction, the coordinator 503 may send it to the blockchain network 106, assuming that any other requirements of a valid transaction are fulfilled. Additionally or alternatively, the coordinator 503 may send the first transaction to the first party 501. For example, the first party 501 may include a signature in an input of the first transaction, therefore funding the transaction. The first party may then submit the first transaction to the blockchain network 106. As another additional or alternative option, the coordinator 503 may send the first transaction to one or more of the second parties 502. One of the second parties may then submit the first transaction to the blockchain network 106. It is also not excluded that the coordinator 503 may send the first transaction to one or more third parties, i.e. a user, entity, etc., other than the first party 501 and the second parties 502.

To generate the first locking script, and specifically the first shared hash value, the coordinator 503 requires access to at least one of: the respective public key of each second party 502, or the second shared hash value. The coordinator 503 does not necessarily need the public keys if at least one of the first shared value and the second shared hash value is available, as it is only the first shared hash value that needs to appear in the first locking script. If the coordinator has access to the public keys, the coordinator 503 may combine them and hash the combination to generate the second shared hash value, and then hash the second shared hash value to generate the first shared hash value. If the coordinator 503 only has the second shared hash value, the coordinator 503 may hash the second shared hash value to generate the first shared hash value.

The public keys may be publicly accessible, e.g. from a webpage or other such resource. In some examples, one or more second parties 502 may send their respective public keys to the coordinator 503. It is also not excluded that a second party 502 may send some or all of the required public keys to the coordinator 503. Rather than obtaining (e.g. receiving) the public keys, the coordinator 503 may receive the first and/or second shared hash values, e.g. from one or more of the second parties 502. For instance, one of the second parties 502 may obtain the public keys of the other second parties 502, and generate the first and/or second shared hash values to be sent to the coordinator 503.

In some examples, each second party 502 may generate a respective intermediate hash value based on the public keys of the other second parties 502 in the group. That is, each second party 502 may obtain the public keys of the other second parties 502, combine the public keys and then hash the combination using the second hash function. Additionally or alternatively, the coordinator 503 may generate one or more of the respective intermediate hash values, and send the intermediate hash values to the respective second parties 502. For instance, the coordinator 503 may send a first intermediate hash value to a first one of the second parties 502a, where the first intermediate hash value is based on the public keys of each of the second parties 502 except that of the first one of the second parties 502a. The coordinator 502 may do the same for a second one of the second parties 502b, and so on.

In some examples, the first hash function may be any cryptographic hash function.

In some examples, the second hash function applied to the target public key to generate the target hash value may be a linear hash function, e.g. the linear hash function defined in the preliminaries:

$$H_0(x) = ax + b \bmod p \bmod q$$

The first locking script may comprise a hash function (HF) script [$H_0$] configured to perform at least four mathematical operations. Each operation may be performed by a single function (e.g. opcode) of the blockchain scripting language (e.g. Script). Alternatively, some or all of the operations may be performed by more than one function. The first operation involves computing a first intermediate result by multiplying the target public key by a first parameter. The first operation may consist of said multiplication. Alternatively, the first operation may involve one or more additional sub-operations (e.g. addition, subtractions, etc.). The second operation involves computing a second intermediate result by adding a second parameter to the first intermediate result. The second operation may consist of said addition. The third operation involves computing a third intermediate result based on performing a first modulo operation on the second intermediate result using a third parameter. In other words, the third intermediate result is based on the remainder after dividing the second intermediate result by the third parameter. The third operation may consist of said first modulo operation. The fourth operation involves computing the hash result based on performing a second modulo operation on the third intermediate result using a fourth parameter. In other words, the fourth intermediate result is based on the remainder after dividing the third intermediate result by the fourth parameter. The fourth operation may consist of said second modulo operation. For instance, the HF script may take the following form:

```
<a>    OP_MUL<b>    OP_ADD<p>    OP_MOD<q>
    OP_MOD,
``` where a is the first parameter, b is the second parameter, a is the third parameter and q is the fourth parameter. The skilled person will be familiar with the opcodes.

The first parameter a may be any non-zero number, and may be chosen randomly. The second parameter b may be any number, and may be chosen randomly. The third parameter p may be a prime number, and may be associated with a particular elliptic curve. For example, p may be the prime number that defines the Secp256k1 elliptic curve which is used by some blockchains, i.e. $p=2^{256}-2^{32}-2^9-2^8-2^7-2^6-2^4-1$. The fourth parameter n takes the form of $2^L$, where L is chosen to define the length of the hash result. In general, L may be any suitable number, e.g. 32, 64, 128, 160, 256, 512, etc. Such a modular function is secure against collisions in the sense that the probability of collisions is negligible for uniformly chosen values.

Alternative hash functions may be used, such as $H_0(x)=ax+b \mod q$, or simply $H_0(x)=x \mod q$. For the former hash function, the first locking script may comprise a HF script configured to generate the hash of the target public key by first generating a first intermediate result based on a multiplication of the target public key by the first parameter, then generating a second intermediate result based on an addition of a second parameter to the first intermediate result, and then generating the expected hash value based on a modulo of the second intermediate result by the fourth parameter. For the latter hash function, the first locking script may comprise a HF script configured to generate the hash of the target public key based on a modulo of the target public key by the fourth parameter. It is also not excluded that the HF script may utilize the existing hash function opcodes, e.g. OP_HASH160.

Once the first transaction has been submitted to the blockchain network 106, e.g. by the coordinator 503, a second transaction can be generated by one of the second parties 502 that has an unlocking script that unlocks the output of the first transaction that is locked by the first locking script. The second party 502 includes in the unlocking script of the second transaction their respective intermediate hash value, their public key and a signature generated using the private key corresponding to the public key. The second transaction is then submitted to the blockchain network 106. Additionally or alternatively, the second transaction may be made available to the first party 501, one or more of the second parties 502, and/or a third party.

The following provides an example implementation of a locking script that can be unlocked by one or multiple parties according to the described embodiments.

In this scheme, a shared hash value is created by linearly combining all the individual public keys through the hash function $H_0$. In this section, each public key is identified as $P_i$, $i=1, \ldots, m$ with its Bitcoin Script encoding $e_i$, and it is assumed throughout that $P_i=e_i$. Since $e_i$ is a byte encoding then we can treat it as a integer.

Assume the parties want to pay to a shared hash value of the form:

$$A = H_1\left(H_0\left(\sum_k e_k\right)\right) = H_1\left(a\sum_k e_k + b \mod p \mod q\right)$$

where $H_1$ is a cryptographic hash function which has a corresponding Bitcoin Script implementation, for example, SHA-256. Since party i owns $P_i$ then the only value they need to know in order to obtain A is:

$$H_{diff}(i) := a\sum_{k \neq i} e_k \mod p \mod q$$

Figure 6:
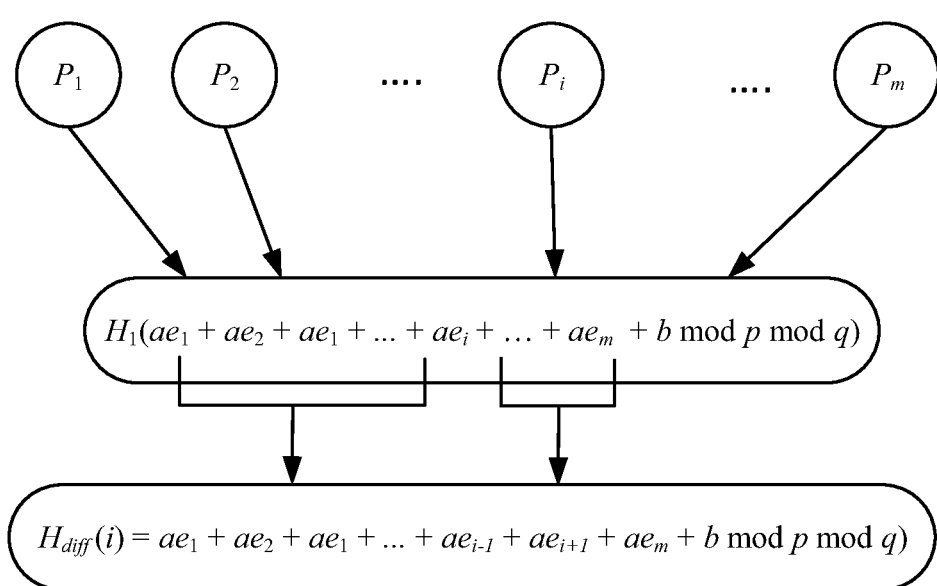

Indeed, we have $A=H_1((H_0(e_i)+H_{diff}(i)) \mod p \mod q)$. This can be visualised in FIG. 6.

The computations can be performed in Bitcoin Script as follows. The unlocking script is given by:

$\langle Sig_{P_i}\rangle \langle P_i\rangle \langle H_{diff}(i)\rangle$, where $H_{diff}(i)$ has been precomputed by party i, or received from the coordinator 503. The corresponding locking script is:

| OP_OVER | [H_0] | OP_ADD | ⟨p⟩ OP_MOD |

OP_OVER    [H_0]    OP_ADD    ⟨p⟩ OP_MOD ⟨q⟩ OP_MOD    [H_1]    ⟨A⟩ OP_EQUALVERIFY OP_CHECKSIG where    [H_0]=⟨a⟩ OP_MULT    ⟨b⟩ OP_ADD ⟨p⟩ OP_MOD ⟨q⟩ OP_MOD and [H_1] is represented by, for example, the opcode OP_SHA256.

Note also that this is just one example of a locking script that be used to implement the described embodiments. In general the locking script may take any form that is configured to work as described.

The trusted coordinator 503 generates the values a, b and q to be used in the creation of A and uses the following protocol for constructing A:

1. Each party i owning a public key $P_i=e_i$ sends this value to the coordinator.
2. The coordinator computes $A=H_1(H_0(\Sigma_k e_k))$
3. For each $i=1, \ldots, m$, the coordinator sends $H_{diff}(i):=a\Sigma_{k \neq i}e_k \mod p \mod q$ to party i.
4. The coordinator can send a transaction template to the paying party, with the locking script given above.

This scheme requires only $O(1)$ computational time. The spatial complexity required to store the locking and unlocking scripts is $O(\min\{\log_8 m+\text{length}(e_i), \log_8 q\})=O(\min\{\log_8 m, \log_8 q\})$ and it can be shown that it reduces to $O(1)$. Every addition of eight public keys in $H_{diff}(i)$ contributes to a lengthening by one byte of its byte representation and thus giving the value $\log_8 m$. Similarly the addition of ten positive integers of the same number of digits amounts to the result having one more digit than the initial integers. Moreover, the lengthening of $H_{diff}(i)$ cannot grow indefinitely since mod p mod q is applied to the summation of public keys. Hence, the length of $H_{diff}(i)$ is at most $\log_8 q$ bytes. This gives the spatial complexity $O(\min\{\log_8 m, \log_8 q\})$. Because $\min\{\log_8 m, \log_8 q\}$; $\log_8 q$ and q is a fixed constant, then $O(\min\{\log_8 m, \log_8 q\})=O(1)$. We conclude that the spatial complexity is $O(1)$, which improves on the spatial complexity of the schemes 3.1 and 3.2 that require $O(m \cdot \text{length}(e_i))=O(m)$ space.

The scheme is secure against any outside malicious attacker that doesn't have access to the unlocking scripts. This is because the shared hash value A is obtained through a cryptographic hash $H_1$. An attacker that only has access to the locking script cannot find $H_0(\Sigma_k e_k)$.

10. Conclusion

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of generating a blockchain transaction, the transaction being for transferring an amount of a digital asset from a first party to one of a plurality of second parties, wherein each second party is associated with a respective public key, and wherein the method is performed by a coordinating party and comprises:

generating a first blockchain transaction, wherein the first blockchain transaction comprises a first locking script comprising a first shared hash value, the first shared hash value being generated by applying a first hash function to a second shared hash value, wherein the second shared hash value is generated by applying a second hash function to a combination of the respective public keys, and wherein the first locking script is configured to, when executed together with a first unlocking script of a second blockchain transaction, a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and making the first blockchain transaction available to at least one of: one or more nodes of a blockchain network, the first party, one of more of the plurality of second parties, and one or more third parties.

Statement 2. The method of statement 1, comprising generating the first shared hash value.

Statement 3. The method of statement 2, comprising:
obtaining the respective public keys; and
generating the second shared hash value.

Statement 4. The method of statement 3, wherein said obtaining of the respective public keys comprises receiving one or more of the respective public keys from one or more of the second parties.

Statement 5. The method of statement 4, wherein each of the one or more respective public keys is received from the second party associated with that public key.

Statement 6. The method of any preceding statement, comprising obtaining the second shared hash value from one or more of the second parties.

Statement 7. The method of any preceding statement, comprising obtaining the first shared hash value from one or more of the second parties.

Statement 8. The method of any preceding statement, comprising:

generating a respective intermediate hash value for each of the second parties, wherein the respective intermediate hash value for a respective second party is based on the respective public key of each of the second parties except that respective second party; and making the respective intermediate hash value available to the respective second party.

Statement 9. The method of any preceding statement, wherein the coordinating party is one of the plurality of second parties.

Statement 10. The method of any of statements 1 to 8, wherein the coordinating party is the first party.

Statement 11. The method of any preceding statement, wherein the first locking script comprises a HF script configured to apply the second hash function to the target public key to generate the target hash value by performing at least the steps of:

generating a first intermediate result based on a multiplication of the target public key by a first parameter, generating a second intermediate result based on an addition of a second parameter to the first intermediate result, generating a third intermediate result based on a modulo of the second intermediate result by a third parameter; and generating the target hash value based on a modulo of the third intermediate result by a fourth parameter.

Statement 12. The method of any of statements 1 to 10, wherein the first locking script comprises a HF script configured to apply the second hash function to the target public key to generate the target hash value by performing at least the steps of:

generating a first intermediate result based on a multiplication of the target public key by a first parameter, generating a second intermediate result based on an addition of a second parameter to the first intermediate result, and generating the target hash value based on a modulo of the second intermediate result by the fourth parameter.

Statement 13. The method of any of statements 1 to 10, wherein the first locking script comprises a HF script configured to apply the second hash function to the target public key to generate the target hash value by performing at least the steps of:

generating the target hash value based on a modulo of the target public key by the fourth parameter.

Statement 14. The method of any of statements 11 to 13, wherein the first parameter is any non-zero number, the second parameter is any number, the third parameter is a positive number, and the fourth parameter is $2^L$, wherein L is chosen to define a length of the hash result.

Statement 15. The method of statement 14, wherein p is a prime number defining the secp256k1 elliptic curve, and/or wherein L is one of: 32, 64, 128, 160, 256, or 512.

Statement 16. The method of any preceding statement, wherein the first and second hash functions are the same hash function.

Statement 17. The method of any of statements 1 to 15, wherein the first and second hash functions are different hash functions.

Statement 18. The method of statement 17, wherein the first hash function is SHA256.

Statement 19. A computer-implemented method of generating a blockchain transaction, the transaction being for unlocking an amount of a digital asset locked to one of a plurality of second parties, wherein each second party is associated with a respective public key and each respective public key is associated with a respective index, wherein the first blockchain transaction comprises a first locking script comprising a first shared hash value, the first shared hash value being generated by applying a first hash function to a second shared hash value, wherein the second shared hash value is generated by applying a second hash function to a combination of the respective public keys, wherein the respective public keys are combined in an order based on the associated respective index, and wherein the first locking script is configured to, when executed together with a first unlocking script of a second blockchain transaction, a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and wherein the method is performed by a target one of the second parties and comprises:

generating the second blockchain transaction, wherein the second blockchain transaction comprises an input that references the first locking script of the first blockchain transaction and the first unlocking script, the first unlocking script comprising the respective public key associated with the target second party, an intermediate hash value generated based on each of the respective public keys of the second parties except that of the target second party, and a valid signature for the respective public key associated with the target second party; and making the second blockchain transaction available to at least one of: one or more nodes of a blockchain network, the first party, one of more of the plurality of second parties, and one or more third parties.

Statement 20. The method of statement 19, comprising sending the target public key to a coordinating party for generating the first blockchain transaction.

Statement 21. The method of statement 19 or statement 20, comprising:

obtaining the respective public key of each of the second parties; and generating the intermediate hash value based on all the respective public keys of each of the second parties except the target second party.

Statement 22. Computer equipment comprising:

memory comprising one or more memory units; and processing apparatus comprising one or more processing units, wherein the memory stores code arranged to run on the processing apparatus, the code being configured so as when on the processing apparatus to perform the method of any preceding statement.

Statement 23. A computer program embodied on computer-readable storage and configured so as, when run on one or more processors, to perform the method of any of statements 1 to 21.

According to another aspect disclosed herein, there may be provided a method comprising the actions of the coordinating party and the second party.

According to another aspect disclosed herein, there may be provided a system comprising the computer equipment of the coordinating party and the second party.

The invention claimed is:

1. A computer-implemented method of generating a blockchain transaction, the transaction being for transferring an amount of a digital asset from a first party to one of a plurality of second parties, wherein each second party is associated with a respective public key, and wherein the method is performed by a coordinating party and comprises:

obtaining a first shared hash value, the first shared hash value being generated by applying a first hash function to a second shared hash value, wherein the second shared hash value is generated by applying a second hash function to a combination of the respective public keys;

generating a first blockchain transaction by including in the first blockchain transaction a first locking script that i) comprises the first shared hash value and ii) is configured to, when executed together with a first unlocking script of a second blockchain transaction:

a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and making the first blockchain transaction available to at least one of: one or more nodes of a blockchain network, the first party, one of more of the plurality of second parties, and one or more third parties.

2. The method of claim 1, comprising generating the first shared hash value.

3. The method of claim 2, comprising:
obtaining the respective public keys; and
generating the second shared hash value.

4. The method of claim 3, wherein said obtaining of the respective public keys comprises receiving one or more of the respective public keys from one or more of the second parties.

5. The method of claim 4, wherein each of the one or more respective public keys is received from the second party associated with that public key.

6. The method of claim 1, comprising obtaining the second shared hash value from one or more of the second parties.

7. The method of claim 1, comprising obtaining the first shared hash value from one or more of the second parties.

8. The method of claim 1, comprising:
generating a respective intermediate hash value for each of the second parties, wherein the respective intermediate hash value for a respective second party is based on the respective public key of each of the second parties except that respective second party; and
making the respective intermediate hash value available to the respective second party.

9. The method of claim 1, wherein the coordinating party is one of the plurality of second parties.

10. The method of claim 1, wherein the coordinating party is the first party.

11. The method of claim 1, wherein the first locking script comprises a HF script configured to apply the second hash function to the target public key to generate the target hash value by performing at least the steps of:
generating a first intermediate result based on a multiplication of the target public key by a first parameter,
generating a second intermediate result based on an addition of a second parameter to the first intermediate result,
generating a third intermediate result based on a modulo of the second intermediate result by a third parameter; and
generating the target hash value based on a modulo of the third intermediate result by a fourth parameter.

12. The method of claim 11, wherein the first locking script comprises a HF script configured to apply the second hash function to the target public key to generate the target hash value by performing at least the steps of:
generating a first intermediate result based on a multiplication of the target public key by a first parameter,
generating a second intermediate result based on an addition of a second parameter to the first intermediate result, and
generating the target hash value based on a modulo of the second intermediate result by the fourth parameter.

13. The method of claim 11, wherein the first locking script comprises a HF script configured to apply the second hash function to the target public key to generate the target hash value by performing at least the steps of:
generating the target hash value based on a modulo of the target public key by the fourth parameter.

14. The method of claim 1, wherein the first and second hash functions are the same hash function.

15. The method of claim 1, wherein the first and second hash functions are different hash functions.

16. The method of claim 15, wherein the first hash function is SHA256.

17. A computer-implemented method of generating a blockchain transaction, the transaction being for unlocking an amount of a digital asset locked to one of a plurality of second parties, wherein each second party is associated with a respective public key and each respective public key is associated with a respective index, wherein a first blockchain transaction comprises a first locking script comprising a first shared hash value, the first shared hash value being generated by applying a first hash function to a second shared hash value, wherein the second shared hash value is generated by applying a second hash function to a combination of the respective public keys, wherein the respective public keys are combined in an order based on the associated respective index, and wherein the first locking script is configured to, when executed together with a first unlocking script of a second blockchain transaction, a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and wherein the method is performed by a target one of the second parties and comprises:
obtaining the respective public key associated with the target second party, an intermediate hash value generated based on each of the respective public keys of the second parties except that of the target second party, and a valid signature for the respective public key associated with the target second party;
generating the first unlocking script comprising the respective public key associated with the target second party, the intermediate hash value, and the valid signature for the respective public key associated with the target second party;
generating the second blockchain transaction by including in the second blockchain transaction an input that references the first locking script of the first blockchain transaction and the first unlocking script; and
making the second blockchain transaction available to at least one of: one or more nodes of a blockchain network, the first party, one of more of the plurality of second parties, and one or more third parties.

18. The method of claim 17, comprising sending the target public key to a coordinating party for generating the first blockchain transaction.

19. The method of claim 17, comprising:
obtaining the respective public key of each of the second parties; and
generating the intermediate hash value based on all the respective public keys of each of the second parties except the target second party.

20. A computer program embodied on non-transitory computer-readable storage media and configured so as, when run on one or more processors, the one or more processors perform a method of generating a blockchain transaction, the transaction being for transferring an amount of a digital asset from a first party to one of a plurality of second parties, wherein each second party is associated with a respective public key, and wherein the method is performed by a coordinating party and comprises:
obtaining a first shared hash value, the first shared hash value being generated by applying a first hash function to a second shared hash value, wherein the second shared hash value is generated by applying a second hash function to a combination of the respective public keys;

generating a first blockchain transaction by including in the first blockchain transaction a first locking script that i) comprises the first shared hash value and ii) is configured to, when executed together with a first unlocking script of a second blockchain transaction:

a) require the first unlocking script to comprise a target public key, a target signature, and an intermediate hash value generated based on all but one of the respective public keys, and b) i) apply the second hash function to the target public key to generate a target hash value, ii) combine the target hash value and the intermediate hash value to generate a target second shared hash value, iii) apply the first hash function to the target second shared hash value to generate a target first shared hash value and verify that the target first shared hash value matches the first shared hash value, and iv) verify that the target signature is a valid signature for the target public key; and making the first blockchain transaction available to at least one of: one or more nodes of a blockchain network, the first party, one of more of the plurality of second parties, and one or more third parties.

\* \* \* \* \*